US011689698B2

(12) United States Patent
Jang

(10) Patent No.: US 11,689,698 B2
(45) Date of Patent: Jun. 27, 2023

(54) LIVE IMAGE PROVING SYSTEM

(71) Applicant: Young Min Jang, Seoul (KR)

(72) Inventor: Young Min Jang, Seoul (KR)

( * ) Notice: Subject to any disclaimer, the term of this patent is extended or adjusted under 35 U.S.C. 154(b) by 0 days.

(21) Appl. No.: 17/382,637

(22) Filed: Jul. 22, 2021

(65) Prior Publication Data

US 2022/0385860 A1   Dec. 1, 2022

(30) Foreign Application Priority Data

May 31, 2021 (KR) .................. 10-2021-0070102

(51) Int. Cl.
| | |
|---|---|
| *G06Q 30/0241* | (2023.01) |
| *H04N 7/18* | (2006.01) |
| *G06F 3/04817* | (2022.01) |
| *G06Q 30/0251* | (2023.01) |
| *H04L 65/61* | (2022.01) |

(52) U.S. Cl.
CPC ......... *H04N 7/181* (2013.01); *G06F 3/04817* (2013.01); *G06Q 30/0241* (2013.01); *G06Q 30/0247* (2013.01); *G06Q 30/0267* (2013.01); *H04L 65/61* (2022.05)

(58) Field of Classification Search
None
See application file for complete search history.

(56) References Cited

U.S. PATENT DOCUMENTS

| | | | | |
|---|---|---|---|---|
| 2009/0319361 A1* | 12/2009 | Conrady | ............... | G06Q 20/10 709/204 |
| 2012/0013738 A1* | 1/2012 | Teti | ........................ | H04N 7/188 348/143 |
| 2015/0324107 A1* | 11/2015 | Van Dijkman | ........ | H04N 23/90 715/719 |

FOREIGN PATENT DOCUMENTS

| | | |
|---|---|---|
| KR | 10-2009-0075591 A | 7/2009 |
| KR | 10-2012-0061261 A | 6/2012 |
| KR | 10-2017-0086320 A | 7/2017 |
| KR | 10-2020-0033556 A | 3/2020 |

OTHER PUBLICATIONS

D. Emma Keith, "14 Michigan police departments are watching neighborhoods through home cameras", retrieved from https://www.freep.com/story/news/local/michigan/2019/08/30/ring-doorbell-michigan-police-departments/2162767001/, available on Aug. 30, 2019 (Year: 2019).*

* cited by examiner

*Primary Examiner* — Sam Refai
(74) *Attorney, Agent, or Firm* — The PL Law Group, PLLC

(57) ABSTRACT

A live image providing system according to an embodiment of the present disclosure provides a real-time live image of each specific location. The live image providing system includes a plurality of image provider terminals transmitting real-time image data containing an external view of a specific location and location information on the specific location, a live image service user terminal requesting for the real-time image data on the specific location, and a platform server transmitting to the live image service user terminal real-time image data of an image provider terminal having location information corresponding to the specific location when receiving a message requesting for the real-time image data on the specific location from the live image service user terminal.

5 Claims, 7 Drawing Sheets

LIVE IMAGE PROVING SYSTEM

CROSS REFERENCE TO RELATED APPLICATION

The present application claims priority to Korean Patent Application No. 10-2021-0070102, filed May 31, 2021, the entire contents of which is incorporated herein for all purposes by this reference.

BACKGROUND

1. Field of the Invention

The present disclosure relates to a live image providing system and, more particularly, to a live image providing system capable of providing a real-time live image using an image capture device installed at each specific location by an ordinary person.

2. Description of the Related Art

A street view service is a service of providing a street picture at a location designated by a user on an electronic map using a pre-captured image.

Still screen images captured in the past have been used in a street view service in the related art. Thus, in a case where a change in a shop or a street situation occurs, the corresponding street picture is not updated.

An ordinary person has difficulty in having access to the Korea government-operated CCTV system providing road images. Furthermore, the CCTV system has the problem of providing low-definition road images.

In addition, a home camera installed in a house for security is a high-priced device that an ordinary person cannot afford to buy for installing in his/her house.

Accordingly, a technology is required that can provide a high-definition real-time image of a location designated by a user using an image capture device that is easy to install.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a live image providing system capable of providing a high-definition real-time image of a location designated by a user using an image capture devices installed by ordinary persons.

According to an aspect of the present disclosure, there is provided a system providing a real-time live image of each specific location. The live image providing system includes a plurality of image provider terminals transmitting real-time image data containing an external view of a specific location and location information on the specific location; a live image service user terminal requesting for the real-time image data on the specific location; and a platform server transmitting to the live image service user terminal real-time image data of an image provider terminal having location information corresponding to the specific location when receiving a message requesting for the real-time image data on the specific location from the live image service user.

The live image providing system may further include: a plurality of image capture devices being installed inside or outside an image provider's house or office space at a specific location and generating real-time image data containing an external view of the house or office space, wherein each of the plurality of image provider terminals may receive from each of the image capture devices location information and the real-time image data on a specific location at which each of the image capture devices is installed.

In the live image providing system, the platform server may display a camera icon for each specific location on an APP (application) map or a WEB (World Wide Web) map on the basis of the location information on the specific location of the image capture device, the location information being received from each of the image provider terminals, when receiving the real-time image data and the location information on the specific location from each of the image provider terminals.

In the live image providing system, the platform server may transmit to the live image service user terminal real-time image data of the image capture device having location information corresponding to a position of the selected camera icon, on the basis of camera icon selection information received from the live image service user terminal.

The live image providing system may further include an advertisement server providing advertisement information to the platform server, wherein the platform server may display the advertisement information on a screen of the live image service user terminal when providing the real-time image data of the image capture device having the location information corresponding to the position of the camera icon selected by the live image service user terminal.

In the live image providing system, the platform server may transmit advertisement profit information to the image provider terminal having the location information corresponding to the position of the camera icon, on the basis of the number of times that the camera icon is selected.

A high-definition real-time image of a location designated by a user can be provided using low-priced image capture devices installed by ordinary persons.

The sharing of the advertisement profit can motivate the image provider to actively participate in providing a real-time image.

A plurality of image providers all over the world can participate in providing real-time images, and this worldwide participation can contribute improvement to street view service technologies.

A human face, a vehicle license plate, and the like can be filtered out from the real-time image, and thus personal information can be protected.

External views of apartments and houses can be captured without high-priced image capture devices and can be stored in the platform server for a fixed period of time. Thus, security concerns can be removed.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
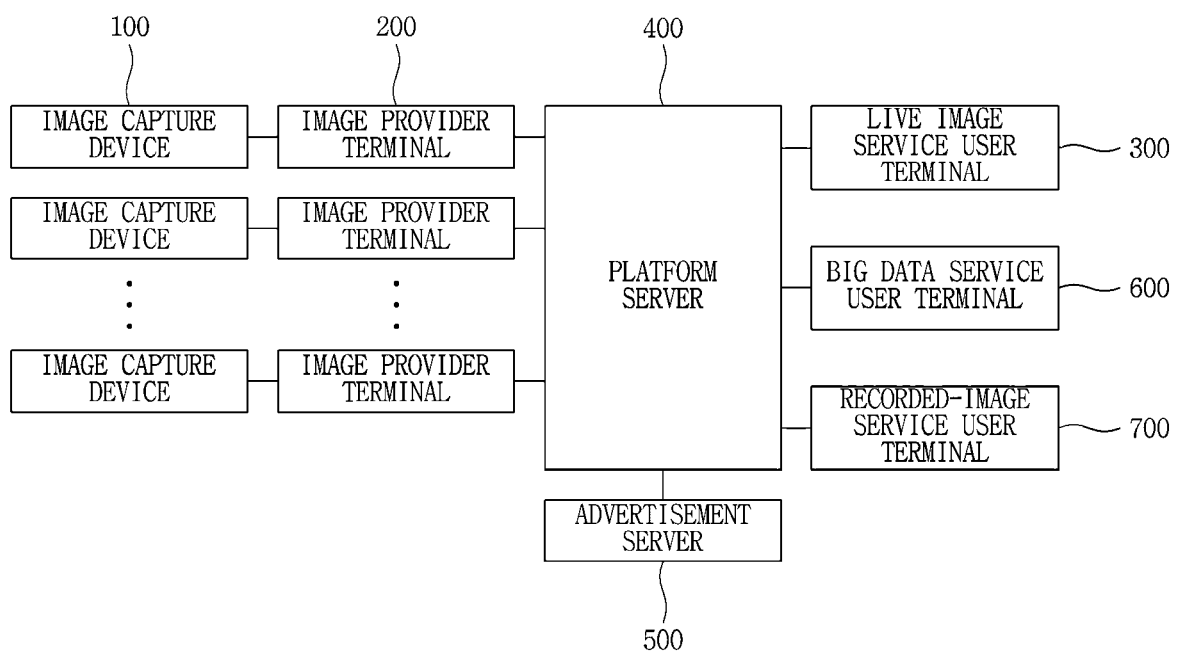
FIG. 1 is a block diagram illustrating a live image providing system according to an embodiment of the present disclosure.

Embodiments of the present disclosure will be described in detail below with reference to the accompanying drawings in such a manner that a person of ordinary skill in the art to which the present disclosure pertains is enabled to practice the present disclosure without undue experimentation. However, the present disclosure can be embodied in various different forms and is not limited to the embodiments that will be described below. For clarification, an illustration unnecessary in describing the present disclosure is omitted from the drawings, and like constituent elements are given like reference numerals throughout the specification.

Unless otherwise specifically stated, an expression "includes a certain constituent element", when used throughout the specification, means that any other constituent element may further be included, not that any other constituent element is excluded.

The terms used throughout the specification are ones selected as much as possible from among general terms that are currently widely used, considering functions performed according to the present disclosure. However, the terms may vary depending on the intention of a person of ordinary skill in the art, a judicial precedent, the appearance of a new technology, or the like. In addition, in a case where terms arbitrarily selected by the applicant are used specifically, the meanings thereof will be stated in detail when the embodiments are described. Therefore, the terms used throughout the specification should be defined in light of the specification, not simply by the dictionary-defined meanings of the terms used.

The terms first, second, and so forth may be used throughout the specification to describe various constituent elements according to the embodiments of the present disclosure, but do not impose limitation thereon. Such terms are used only to distinguish one element from another. For example, a first constituent element may be expressed as a second constituent element without departing from the scope of the present disclosure. In the same manner, the second constituent element may also be expressed as the first constituent element. The phrase "and/or" is used to join two words, phrases, or sentences or to refer to one of the two words, phrases, or sentences.

In addition, the term used throughout the specification, although expressed in the singular, is construed to have a plural meaning, unless otherwise meant in context.

In addition, the term "include", "have", or the like throughout the specification is intended to indicate that a feature, a number, a step, an operation, a constituent element, a component, or combinations of these, which is described according to an embodiment and thus reference samples the specification, is present, and thus should be understood not to pre-exclude the possibility that one or more other features, numbers, steps, operations, constituent elements, components, or combinations of these will be present or added.

In addition, the term "module", "unit", or the like, which is used throughout the specification, means an individual component that performs at least one function or operation and may be realized in hardware, software, or a combination of both. In addition, the term a plurality of "modules" or a plurality of "units" may be integrated into at least one module and thus realized as at least one processor, except for the "module" or the "unit" that is necessary to be realized specifically in hardware.

FIG. 1 is a block diagram illustrating a live image providing system according to an embodiment of the present disclosure.

Figure 2:
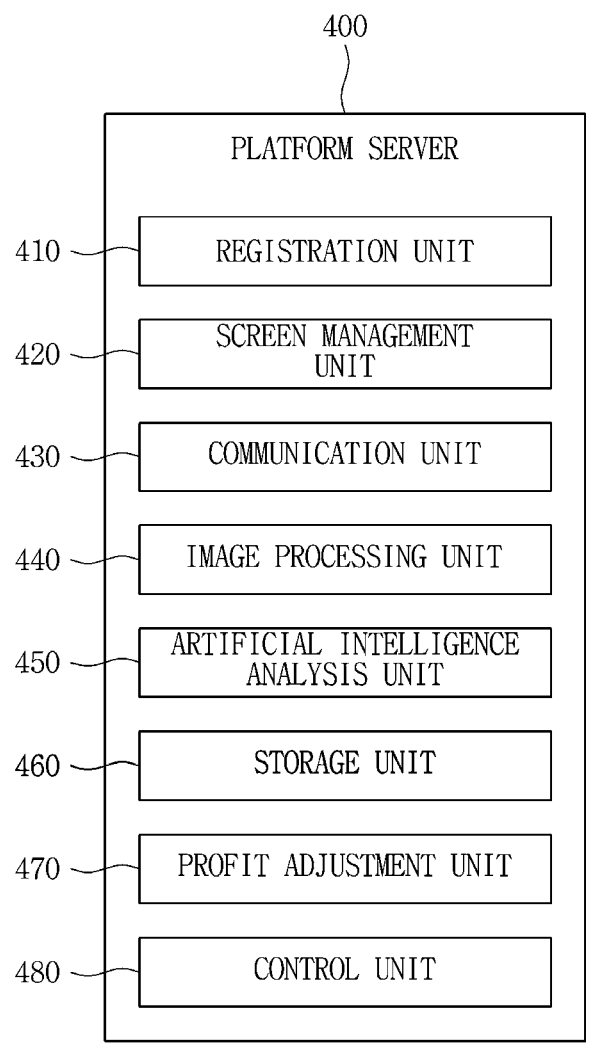
FIG. 2 is a block diagram illustrating a platform server of the live image providing system according to the embodiment.

FIG. 2 is a block diagram illustrating a platform server of the live image providing system according to the embodiment.

FIGS. 3 to 6 are views each illustrating operation of the platform server of the live image providing system according to the embodiment.

With reference to FIG. 1, the live image providing system according to the embodiment includes an image capture device 100, an image provider terminal 200, a live image service user terminal 300, a platform server 400, an advertisement server 500, a big data service user terminal 600, and a recorded-image service user terminal 700.

The image capture device 100 may be installed inside or outside an image provider's house or office space that is located at a specific position on a map, and may generate real-time image data containing an external view of the house or office space. As an implementation example, image data may contain the external view containing a road, a building, a person, a vehicle, and the like.

As an implementation example, the image capture device 100 may be installed on a tripod when intended to be installed inside the house or office space and may be fixed on an external wall when intended to be installed outside the house or office space.

An implementation example, the image capture device 100 may be an IP camera transmitting and receiving data using 2G or 5G WiFi inside and outside the house or office space.

As an implementation example, the image capture device 100 may be a digital device equipped with a memory device and a microprocessor and thus having computing capability, such as a mobile communication terminal, a desktop computer, a notebook computer, a workstation, a palmtop computer, a personal digital assistant (PDA), a webpad, or the like.

As an implementation example, the image capture device 100 may include a high-definition image sensor, a temperature sensor generating temperature data, a humidity sensor generating humidity data, an atmospheric pressure sensor generating atmospheric pressure data, a microphone generating voice data, and a GPS sensor generating GPS location information.

As an implementation example, a plurality of image capture devices 100 may be provided and may be installed inside and outside each of the image providers' houses or office spaces.

As an implementation example, the image provider terminal 200 may transmit to the platform server 400 real-time image data containing an external view of a specific location, and location information on a specific location of the image capture device 100. As an implementation example, the location information on the specific location may be GPS coordinate information on a location where the image capture device 100 is installed.

As an implementation example, the image provider terminal 200 may be directly connected to the image capture device 100 through dynamic DNS services (DDNS) of a WiFi router and may receive the real-time image data and the location information on the specific location of the image capture device 100 from the image capture device 100.

As an implementation example, the image provider terminal 200 may be connected to the image capture device 100 through an APP (application) or a WEB (World Wide Web) and may disable a voice recording function of the image capture device 100 for the purpose of security. The image provider terminal 200 may transmit to the platform server 400 image data from which voice data is removed.

As an implementation example, the image terminal 200 may be a digital device equipped with a memory device and a microprocessor and thus having computing capability, such as a mobile communication terminal, a desktop computer, a notebook computer, a workstation, a palmtop computer, a personal digital assistant (PDA), a webpad, or the like.

As an implementation example, the image capture device 100 may transmit the real-time image data to an external server through an Internet-of-Thing (IoT) network, and the image provider terminal 200 may receive the real-time image data from the external server through the IoT network.

As an implementation example, the image capture device 100 may transmit the real-time image data and the location information on the specific location to the platform server 400 through the WiFi router.

As an implementation example, the image provider terminal 200 may make a connection to the platform server 400 through the APP (application) or the WEB (World Wide Web) and may transmit the real-time image data, the location information on the specific location, account information of the image capture device 100.

As an implementation example, the live image service user terminal 300 may select a camera icon at a specific position on an APP (application) map or a WEB (World Wide Web) map, which is provided by the platform server 400 and may transmit to the platform server 400 a message requesting for the real-time image data on the specific location. The message requesting for the real-time image data on the specific location may contain camera icon selection information, and the camera icon selection information may contain the location information on the specific location.

When receiving the message requesting for the real-time image data on the specific location from the live image service user terminal 300, the platform server 400 may transmit to the live image service user terminal 300 the real-time image data of the image provider terminal 200 having the location information corresponding to the specific location.

With reference to FIG. 2, the platform server 400 includes a registration unit 410, a screen management unit 420, a communication unit 430, an image processing unit 440, an artificial intelligence analysis unit 450, a storage unit 460, a profit adjustment unit 470, and a control unit 480.

As an implementation example, when receiving a message requesting for real-time image data registration from the image provider terminal 200, the registration unit 410 may register an IP address of the image capture device 100 connected to the image provider terminal 200.

Figure 3:
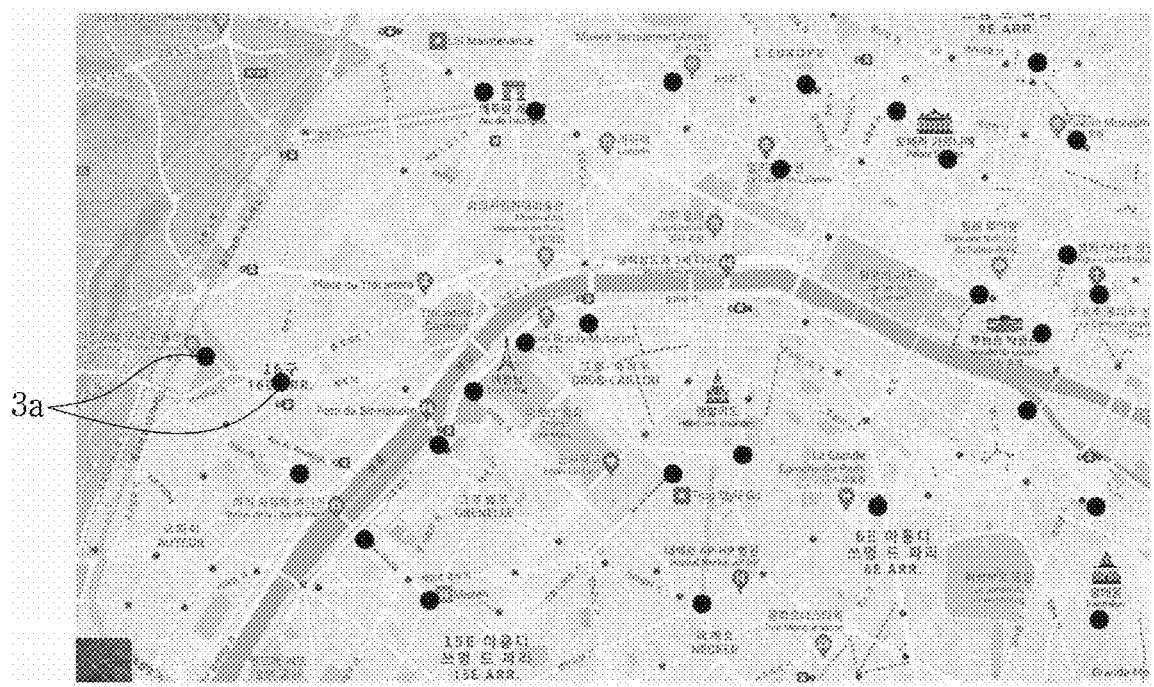
FIGS. 3 to 6 are views each illustrating operation of the platform server of the live image providing system according to the embodiment.

With reference to FIG. 3, as an implementation example, when receiving the real-time image data and the location information on the specific location from each image provider terminal 200, the screen management unit 420 may display a camera icon 3*a* for each specific location on the APP (application) map or the WEB (World Wide Web) map on the basis of the location information, received from each image provider terminal 200, on the specific location of the image capture device 100.

Figure 4:
Figure 5:

With reference to FIGS. 4 and 5, as an implementation example, when providing to the live image service user terminal 300 real-time image data of the image capture device 100 having location information corresponding to a position of the selected camera icon, the screen management unit 420 may display advertisement information on a screen of the live image service user terminal 300.

As an implementation example, the screen management unit 420 may display the advertisement information at a preset position on the screen, to which the real-time image data is output, of the live image service user terminal 300.

As an implementation example, the screen management unit 420 may display the advertisement information on a square frame area that is set at a preset position on the screen, to which the real-time image data is output, of the live image service user terminal 300.

As an implementation example, when providing the real-time image data to the live image service user terminal 300, the screen management unit 420 may output a moving image advertisement to the image and may generate a skipping icon when a preset time elapses.

As an implementation example, when providing the real-time image data to the live image service user terminal 300, the screen management unit 420 may display the advertisement information on an image in the shape of an electronic board on the screen.

As an implementation example, when providing the real-time image data to the live image service user terminal 300, the screen management unit 420 may display real-time chatting information on the screen.

As an implementation example, when providing the real-time image data to the live image service user terminal 300, the screen management unit 420 may display on the screen a survey on preset evaluation items.

As an implementation example, the communication unit 430 may include a communication module transmitting and receiving data to and from the image provider terminal 200, the live image service user terminal 300 the advertisement server 500, the big data service user terminal 600, and the recorded-image service user terminal 700 using wired and wireless communication.

As an implementation example, the communication unit 430 may receive the real-time image data of the image capture device 100 from the image provider terminal 200 and may receive the real-time image data directly from the image capture device 100 on the basis of information on the IP address of the image capture device 100.

As an implementation example, the communication unit 430 may transmit to the live image service user terminal 300 the real-time image data of the image capture device 100 having the location information corresponding to the position of the selected camera icon, on the basis of the camera icon selection information received from the live image service user terminal 300.

Figure 6:

With reference to FIG. 6, as an implementation example, using a pre-stored image processing algorithm, the image processing unit 440 may filter out a human face or a vehicle license plate from the real-time image data of the image capture device 100 corresponding to the position of the selected camera icon and may generate corrected image data.

The pre-stored image processing algorithm may be a blurring algorithm.

As an implementation example, the image processing unit 440 may perform blurring on the human face and the vehicle license plate in the real-time image data and may generate the corrected image data.

As an implementation example, the image processing unit 440 performs filtering on the real-time image data received from the image provider terminal 200 or the image capture device 100. Then, after 10 to 60 seconds elapses, the image processing unit 440 may transmit the corrected image data to the live image service user terminal 300.

As an implementation example, when receiving a message requesting for blurring processing of a specific portion (for example, a window of a house or an office) of an image from the image provider terminal 200, the image processing unit 440 may perform blurring on the specific portion in the real-time image data received from the image provider terminal 200.

As an implementation example, the artificial intelligence analysis unit 450 may analyze the real-time image data received from a plurality of the image provider terminals 200 using a pre-stored artificial intelligence algorithm and may generate big data analysis information containing information on an amount of people traffic and information on an amount of vehicle traffic at each specific location.

As an implementation example, the artificial intelligence analysis unit 450 may analyze temperature data, humidity data, and atmospheric pressure data that are received from a plurality of the image provider terminals 200 or a plurality of the image capture devices 100 using the pre-stored artificial intelligence algorithm, and may generate weather information.

The storage unit 460 may store the real-time image data, the location information on the specific location, and the account information that are received by the plurality of the image provider terminals 200.

As an implementation example, the profit adjustment unit 470 may generate advertisement profit information for the image provider terminal 200 on the basis of a result of comparing information in the number of times that the camera icon corresponding to the registered image provider terminal 200 is selected, with pre-stored profit map data.

As an implementation example, the profit adjustment unit 470 may transmit the advertisement profit information to the image provider terminal 200 having the location information corresponding to the position of the camera icon through the communication unit 430.

As an implementation example, when receiving from the image provider terminal 200 a message requesting for withdrawal, the profit adjustment unit 470 may perform electronic transfer to a bank account or a simple payment service account (for example, PAYPAL or NAVER PAY) of the image provider terminal 200 on the basis of the advertisement profit information for the image provider terminal 200. Accordingly, the image provider may apply for the withdrawal to the personal bank account or the simple payment server account whenever he/she wants to do so.

As an implementation example, the control unit 480 may control operation of each of the registration unit 410, the screen management unit 420, the communication unit 430, the image processing unit 440, artificial intelligence analysis unit 450, the storage unit 460, and the profit adjustment unit 470.

As an implementation example, when receiving a message requesting for the big data analysis information from the big data service user terminal 600, the control unit 480 may transmit the big data analysis information to the big data service user terminal 600 through the communication unit 430.

As an implementation example, when receiving a message requesting for a recorded image at a specific point in time from the recorded-image service user terminal 700, the control unit 480 may transmit the image data stored at the specific point in time to the recorded-image service user terminal 700. The recorded image at the specific point in time may be utilized as criminal evidence or evidence of a crime or a traffic accident. As an implementation example, the plurality of the image provider terminals 200 having the same location information may be registered with the platform server 400.

As an implementation example, when the live image service user terminal 300 selects a camera icon indicating that the plurality of the image provider terminals 200 are registered, the control unit 480 may perform comparison with a preset standard requirement and may set the priority of exposure to the screen.

As an implementation example, the standard requirement may be on an altitude, a resolution, and a view angle of a camera, the performing or non-performing of a function of collecting temperature, humidity, and atmospheric pressure, the number of times of clicking on the screen, the number of times of clicking on an advertisement, and a grade given by service users.

As an implementation example, when the plurality of the image provider terminals 200 having the same location information are registered with the platform server 400, the control unit 480 may expose to the uppermost end portion of the screen the image provider terminal 200 that has the highest altitude, the highest resolution, and the widest view angle of the camera, is capable of performing the function of collecting temperature, humidity, and atmospheric pressure, has the largest number of times of clicking on the screen, has the largest number of times of clicking on the advertisement, and has the highest grade given by the service users.

As an implementation example, the advertisement server 500 may provide the advertisement information to the platform server 400.

As an implementation example, the big data service user terminal 600 may transmit to the platform server 400 a message requesting for the big data analysis information.

As an implementation example, the big data service user terminal 600 may be a digital device equipped with a memory device and a microprocessor and thus having computing capability, such as a mobile communication terminal, a desktop computer, a notebook computer, a workstation, a palmtop computer, a personal digital assistant (PDA), a webpad, or the like.

As an implementation example, the recorded-image service user terminal 700 may transmit to the platform server 400 a message requesting for the recorded image at a specific point in time. As an implementation example, the recorded-image service user terminal 700 may be a user terminal of a national investigation agency.

As an implementation example, the recorded-image service user terminal 700 may be a digital device equipped with a memory device and a microprocessor and thus having computing capability, such as a mobile communication terminal, a desktop computer, a notebook computer, a workstation, a palmtop computer, a personal digital assistant (PDA), a webpad, or the like.

Figure 7:
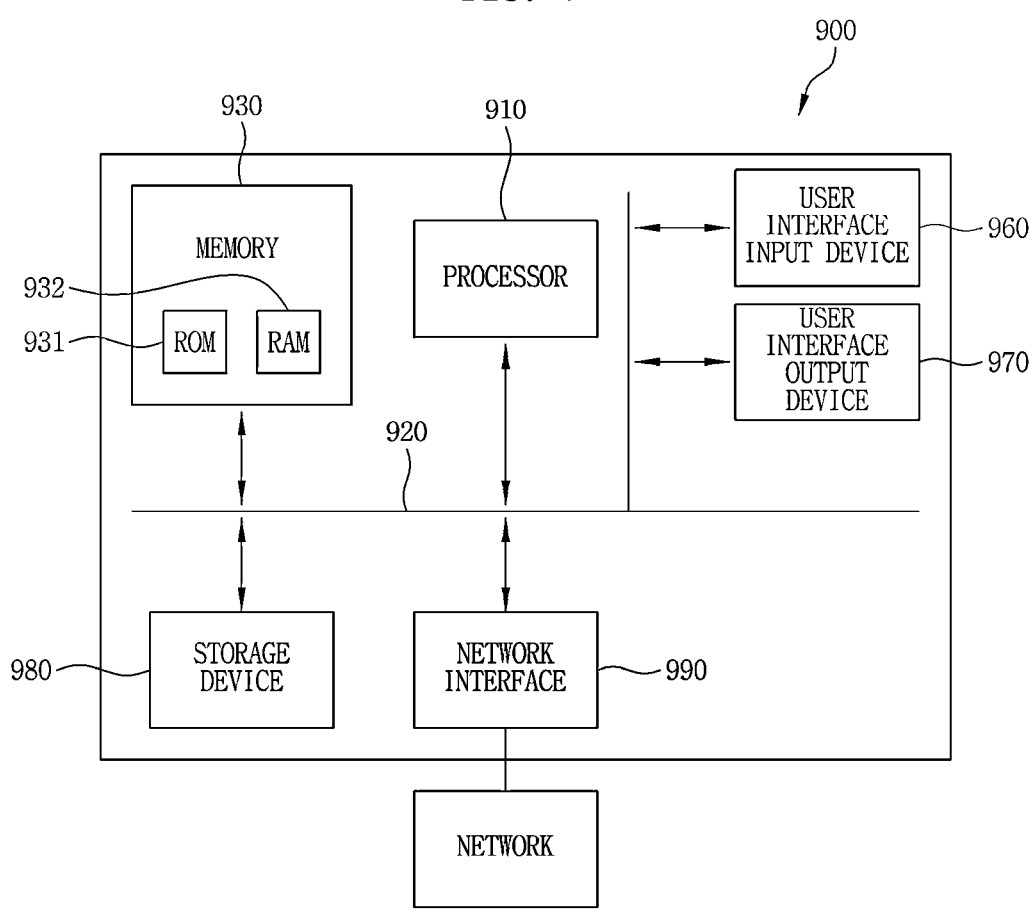
FIG. 7 is a block diagram illustrating the platform server of the live image providing system according to the embodiment.

FIG. 7 is a block diagram illustrating the platform server of the live image providing system according to the embodiment.

With reference to FIG. 7, the platform server of the live image providing system according to the embodiment may be realized as a computer system, such as a computer system capable of processing data stored in a computer-readable medium. A computer system 900 may include at least one of a processor 910 communicating through a bus 920, a memory 930, a user interface input device 960, a user interface output device 970, and a storage device 980. The computer system 900 may include a network interface 990 that makes a connection to a network. The processor 910 may be a central processing unit (CPU) or a semiconductor device executing commands stored in the memory 930 or the storage device 980. Examples of the memory 930 and the storage device 980 may include various types of volatile or nonvolatile storage mediums. Examples of the memory 930 include a read only memory (ROM) 931 and a random access memory (RAM) 932. The embodiment of the present disclosure may be embodied as a method executable in a computer or may be realized as a computer-readable nonvolatile medium in which computer-executable commands are stored. As an implementation example, the computer-readable command, when executed by the processor, may perform a method according to at least one aspect of the present disclosure.

The platform server according to an embodiment of the disclosure includes a processor 910 and a memory 930. The processor 910 may perform a step of executing a program stored in the memory 930 and receiving a message requesting for registration of real-time image data from a plurality of image provider terminals 200, a step of displaying a camera icon for each specific location on an APP (application) map or a WEB (World Wide Web) map on the basis of location information, received from each image provider terminal 200, on a specific location of an image capture device 100 when the real-time image data and the location information on the specific location are received from the plurality of the image provider terminals 200, a step of receiving a camera icon selection information received from a live image service user terminal 300, a step of generating image data corrected by filtering out a human face or a vehicle license plate from the real-time image data of the image capture device 100 having the location information corresponding to a position of the selected camera icon, using a pre-stored image processing algorithm, and transmitting the corrected image data to the live image service user terminal 300, a step of displaying advertisement information on a screen of the live image service user terminal 300 when the real-time image data of the image capture device 100 having the location information corresponding to the position of the selected camera icon is provided to the live image service user terminal 300, and a step of transmitting advertisement profit information to the image provider terminal 200 having the location information corresponding to the position of the camera icon, on the basis of the number of times that the camera icon is selected.

Operation of the processor 910 is the same as the above-described operation of the platform, and thus a detailed descriptor thereof is omitted.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A live image providing system providing a real-time live image of each specific location, the live image providing system comprising:
image capture devices installed inside or outside an image provider's house or office space at a specific location, the plurality of image capture devices configured for generating real-time image data containing an external view of the house or the office space,
a plurality of image provider terminals each configured to receive from each of the image capture devices location information and real-time image data on a specific location at which each of the image capture devices is installed and to transmit the real-time image data generated by the plurality of image capture devices;
a live image service user terminal configured for requesting for the real-time image data on the specific location;
a platform server configured for transmitting to the live image service user terminal real-time image data of an image provider terminal having location information corresponding to the specific location when receiving a message requesting for the real-time image data on the specific location from the live image service user terminal, the platform server comprising an artificial intelligence analysis unit configured to analyze the real-time image data received from the plurality of the image provider terminals by using a pre-stored artificial intelligence algorithm and configured to generate big data analysis information containing information on an amount of people traffic and information on an amount of vehicle traffic at each specific location;
a big data service user terminal configured to transmit to the platform server a message requesting for the big data analysis information; and
an advertisement server providing advertisement information to the platform server,
wherein the platform server is configured to:
display the advertisement information on a screen of the live image service user terminal when providing the real-time image data of the image capture device having the location information corresponding to the position of the camera icon selected by the live image service user terminal; and
transmit advertisement profit information to the image provider terminal having the location information corresponding to the position of the camera icon, on the basis of the number of times that the camera icon is selected.

2. The live image providing system of claim 1, wherein the platform server is configured to display a camera icon for each specific location on an APP (application) map or a WEB (World Wide Web) map on the basis of the location information on the specific location of the image capture device, the location information being received from each of the image provider terminals, when receiving the real-time image data and the location information on the specific location from each of the image provider terminals.

3. The live image providing system of claim 2, wherein the platform server is configured to transmit to the live image service user terminal real-time image data of the image capture device having location information corresponding to a position of the selected camera icon, on the basis of camera icon selection information received from the live image service user terminal.

4. The live image providing system of claim 1, wherein the image capture devices include at least one of a high-definition image sensor, a temperature sensor generating temperature data, a humidity sensor generating humidity data, an atmospheric pressure sensor generating atmospheric pressure data, a microphone generating voice data, and a global positioning system (GPS) sensor generating GPS location information; and the artificial intelligence analysis unit is configured to analyze at least one of the temperature data, the humidity data, and the atmospheric pressure data by using the pre-stored artificial intelligence algorithm.

5. The live image providing system of claim 1, wherein the image capture devices include a high-definition image sensor, a temperature sensor generating temperature data, a humidity sensor generating humidity data, an atmospheric pressure sensor generating atmospheric pressure data, a microphone generating voice data, and a global positioning system (GPS) sensor generating GPS location information; and the artificial intelligence analysis unit is configured to analyze the temperature data, the humidity data, and the atmospheric pressure data by using the pre-stored artificial intelligence algorithm.

\* \* \* \* \*